UNITED STATES PATENT OFFICE 2,603,560

DIESTERS OF DIBASIC ACIDS AS PLANT GROWTH REGULANTS

William D. Stewart, Yonkers, N. Y., assignor to The B. F. Goodrich Company, New York, N. Y., a corporation of New York No Drawing. Application December 3, 1947, Serial No. 789,562

22 Claims. (Cl. 71—2.3)

This invention relates to the regulation of plant growth and to synthetic compositions which produce histogenic and morphogenic changes in living plants. It pertains, more specifically, to the use of certain diesters of dibasic acids in altering the growth characteristics of plants.

The art of controlled modification of plant growth by the application of synthetic growth regulants has aroused considerable interest in recent years. Many materials have been discovered which when applied to plant structure in minute amounts act as growth regulants. For example, chemical compounds have been found which stimulate and initiate root growth, which stimulate the growth of the abscission cells of fruit stems, which, at increased dosages retard the growth of the abscission cells of fruit stems, which stimulate stem bud growth, which stimulate seed germination, which promote callus formation, and which function in similar ways as evocators of plant histogenesis and morphogenesis.

Among the known synthetic plant growth regulants are for example, indoleacetic acid, indolebutyric acid, indolepyruvic acid, naphthalene acetic acid, napthalene butyric acid, phenyl acetic acid, 2,4-dichlorophenoxy acetic acid, naphthalene glycolic acid and others. While these materials have been widely used they have not been completed satisfactory and hence there is a great need in the art of plant propagation for improved growth regulants. The known regulants and growth initiators are less effective than is desired in various aspects of plant propagation, for example, in the rooting of fruit tree cuttings to propagate desirable somatic charactreistics of plants which cannot be transferred by the use of seed, in increasing the percentage of rooted cuttings of those plants now normally produced from cuttings instead of seed, in reducing the number of set fruit on heavy bearing fruit trees, in producing higher setting of fruit on light setting trees and bushes, in preventing the premature fall of fruit and in producing seedless or near seedless fruits by inducing parthenogenesis.

Moreover, few of the known plant growth regulants can be synthesized on factory production scale so as to be either available in large enough quantities to supply the demand or sufficiently low in price to attract the attention of prospective users. Also, those which are available in sufficient quantity and at a marketable price to make their use economically feasible do not have as wide a range of tolerance of application as is desirable, for the difference between the effective concentration and that which causes undesirable injury to the plant is relatively small in many instances. Consequently, the use of many of the regulants that are now available not only requires the attention of a highly skilled technically trained supervisor during application of the materials but also requires the precise measuring of small quantities in the field with precision usually available only in the chemical laboratory. Accordingly, the precision and supervision required to employ successfully the available regulants and to achieve the maximum benefits of their use often prevent large scale field application by the average prospective user.

I have discovered a class of growth regulants which are exceedingly valuable in the art of plant propagation for altering the growth characteristics of plants and which are capable of being successfully applied by the average person possessing no special skill. The materials which I have found to be excellent growth regulants are diesters of dibasic organic acids containing from 1 to 16 acyclic carbon atoms. They are further characterized in that one of the alcohol residues in the diester is an alkenyl radical preferably one which contains a methylene group attached by a double bond to a carbon atom, and the other alcohol residue is a hydrocarbon radical, such as an alkyl radical, an alicyclic hydrocarbon radical, an alkenyl radical, an aryl radical or an aralkyl radical, or a monochloro derivative of such a hydrocarbon radical. These materials function as evocators of histogenesis and morphogenesis in diverse manners to alter the growth characteristics of many types of plants.

The preferred compounds of this new class of growth regulants are those which have the following general formulae:

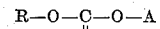

I

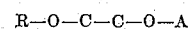

II

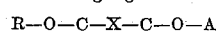

III where R is an alkenyl radical containing 2 to 10 carbon atoms, preferably one containing the

structure such as allyl or methallyl, A is a hydrocarbon radical containing 1 to 10 carbon atoms or is a monochloro derivative of such a hydrocarbon radical, and X is a bivalent aliphatic hydrocarbon radical containing from 1 to 14 carbon atoms. More specifically, X may be an alkylene, alkylidene, alkenylene or alkynylene radical and A may be such a hydrocarbon radical as alkyl, alkenyl, cycloalkyl, cycloalkenyl, aryl, and aralkyl as well as the monochloro derivatives of these hydrocarbon radicals such as monochloroalkyl, monochloroalkenyl, monochlorocycloalkyl, monochlorocycloalkenyl, monochloroaryl, monochloroaralkyl, and the like.

These compounds can be readily and economically prepared by numerous methods known to the art of chemical synthesis as is specifically disclosed and discussed in prior patents and in the literature. For example, the dicarbonates (Formula I above) may be prepared by reacting phosgene with an alkenol to form an alkenyl chloroformate and then reacting this product with an alcohol or phenol.

The dioxalates, illustrated by Formula II above, can be prepared by conventional esterification of oxalic acid. Similarly, the diesters, illustrated by Formula III above, can be prepared by esterifying such other saturated dicarboxylic acids as malonic acid, succinic acid, alpha-beta-diethyl succinic acid, glutaric acid, alpha-methyl glutaric acid, adipic acid, pimelic acid, suberic acid, azelaic acid, sebacic acid, hendecanedioic acid, dodecanedioic acid, brassylic acid, and thaspic acid or from such unsaturated dicarboxylic acids as maleic acid, fumaric acid, glutaconic acid, hydromuconic acids, octendioic acids, acetylene dicarboxylic acid and the like.

As the above general formulae indicate the diesters may be mixed, that is, contain an alkenyl group as one alcohol residue and one other alcohol residue that is not alkenyl, or they may be dialkenyl esters, hereinafter referred to as biesters. A few specific examples of biesters which have growth regulating utility are for example such biesters as allyl vinyl carbonate, diallyl carbonate, dimethallyl carbonate, allyl methallyl carbonate, diisopropenyl carbonate, di-3-butenyl carbonate, dipentenyl, octenyl and decenyl carbonates, allyl 3-methyl-3-hexenyl carbonate, allyl 3-neopentyl-3-butenyl carbonate, and similar biesters of the above enumerated dicarboxylic acids wherein the R and A components are such alkenyl groups as vinyl, allyl, methallyl, isopropenyl, butenyl, pentenyl, octenyl, decenyl, 3-methyl-3-hexenyl, 2-methyl-1-butenyl, etc. Mixed esters of carbonic acid or of the above enumerated dicarboxylic acids, where R is any of these alkenyl groups and A is a hydrocarbon radical other than an alkenyl radical, such as methyl, ethyl, butyl, isopropyl, amyl, octyl, decyl, cyclohexyl, o-methyl cyclohexyl, phenyl, benzyl, phenethyl, naphthyl, tolyl and the like are also useful growth regulants. Among these mixed diesters there may be mentioned, for example, allyl methyl carbonate, allyl phenyl carbonate, methallyl cyclohexyl carbonate, allyl methyl adipate, methallyl methyl succinate, allyl ethyl glutarate, allyl phenyl pimelate, allyl cyclohexyl pimelate, allyl benzyl maleate and similar mixed esters of the other above-mentioned saturated and unsaturated dicarboxylic acids. Other useful mixed diesters wherein A is a monochloro derivative of a hydrocarbon radical are, for example, methallyl p-chlorophenyl carbonate, allyl p-chlorophenyl carbonate, allyl p-chlorophenyl adipate, methallyl p-chlorophenyl pimelate, allyl monochloromethyl succinate, and others.

The compounds of this invention may be employed in numerous ways to stimulate or modify the growth characteristics of plant structures. For example, they may be applied to seeds to stimulate germination or to stimulate root and stem development; they may be applied to tubers to promote root development and stem bud growth; they may be applied to cuttings and transplants to stimulate root formation; or they may be applied to blossoms to induce parthenogenesis. Also, they may be applied to intact plants to retard blossoming, to stimulate the growth of abscission cells to produce premature dropping of blossoms and set fruit, or by varying the manner of treatment may also modify the growth of abscission cells to prevent the drop of mature fruit. Thus, these compounds may be capable of producing a variety of desirous modifications of plant growth which are exceedingly useful and beneficial to the operators of greenhouses, orchards and nurseries.

In the application of these compounds to produce these growth modifications different compositions may be employed. In general, aqueous dispersions or aqueous solutions depending on whether or not the compound is water-soluble will be found most desirable. The dispersions will of course contain a dispersing or wetting agent and the solutions also preferably contain wetting agents to facilitate the spreading of the solution. Such wetting and dispersing agents may be employed as, for example, those typified by the following general classifications: sodium and potassium salts of fatty acids known as soft and hard soaps; salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having 8 to 20 carbon atoms in the alkyl group; water-soluble aryl sulfonates; water-soluble alkyl aryl sulfonates; water-soluble aralkyl sulfonates; water-soluble sorbitan monolaurate, palmitate, stearate, and oleate; and others. These dispersing and wetting agents are sold under numerous trade names and may be either pure compounds or mixtures of compounds of the same general group. The aqueous dispersions may also contain adhesives or stickers to prevent the removal of the stimuli by weathering. A material which will function as an excellent sticker or adhesive and may be employed advantageously is an aqueous dispersion of a polymeric organic polysulfide which on drying forms a discontinuous, translucent, rubbery, microscopic film. An example of this type of sticker is the aqueous dispersion of polymeric ethylene polysulfide prepared by reacting ethylene dichloride with an aqueous alkali polysulfide solution in the presence of a salt-stable emulsifying agent. These polymeric organic polysulfides have considerable fungicidal activity and thus, when employed as a sticker in the treatment of cuttings, aid in preventing rotting of the cutting during bench rooting.

The compounds may also be applied in admixture with other diluents either as solutions, dispersions, pastes or dusts. The solutions, dispersions and pastes may be prepared with any inert liquid vehicle while the dusts are usually prepared with some finely-divided inert solid material such as talc, flour, fuller's earth, clay, or other pulverulent materials, soluble or insoluble in water.

In all their various applications, these plant growth modifying or stimulating compositions are applied to plant structures which are capable of growth, i. e., plant structures containing growing cells and such plant structures containing dormant cells as tubers and seeds. In the application of these growth regulants to tubers and seeds, it is not known whether the action of the material is to modify the tuber or seed or to alter the growth characteristics of the plant which results from the tuber or seed. For the purposes of this invention, it is intended that the use of the term "plant" includes the dormant as well as growing plants.

The following examples illustrate the ability of these compositions to stimulate the growth of various plant structures and further illustrate the numerous compositions in which these compounds can be successfully employed. In many of the examples, the results obtained from the use of indolebutyric acid, a growth promoting material which has enjoyed considerable commercial success, are given merely for purposes of comparison.

EXAMPLE I

Three inch terminal cuttings of Chrysanthemum, varieties Mary L. Hall and Little America, were partially immersed for 30 seconds in aqueous solutions containing members of the class of diesters of organic dibasic acids hereinbefore defined. The treated portion of the cuttings were stuck in wet sterilized sand and watered regularly. After 11 days of such bench rooting trials the cuttings were carefully removed from the sand bed and were examined for callus and root growth. Each aqueous solution was prepared by dissolving a small quantity of the stimulant in an aqueous solution containing 0.025% by weight of a wetting agent composed primarily of sodium lauryl sulfate. The concentrations employed and the rooting initiation are shown for typical members of this new class of growth regulants in Table I below.

Table I.—*Rooting initiation of chrysanthemum cuttings*

VARIETY—MARY L. HALL

| Material Employed | Concentration, grams per liter | 11 Day Bench Trial Response |
|---|---|---|
| Allyl Methallyl Carbonate | 1.00 / 0.50 / 0.25 | All cuttings heavily rooted and uniformly calloused. |
| Diallyl Pimelate | 1.00 / 0.50 / 0.25 | All cuttings heavily rooted and uniformly calloused. |
| Diallyl Carbonate | 1.00 / 0.50 / 0.25 | All cuttings heavily rooted with numerous primordia and uniformly calloused. |

VARIETY—LITTLE AMERICA

| Diallyl Carbonate | 1.00 / 0.50 / 0.25 | All heavily rooted and uniformly calloused. |
| Diallyl Pimelate | 1.00 / 0.50 / 0.25 | All heavily rooted and uniformly calloused. |
| Allyl Methallyl Carbonate | 1.00 / 0.50 / 0.25 | All heavily rooted and uniformly calloused. |

Chrysanthemum cuttings were also partially immersed in an aqueous solution containing 0.2 gram of indolebutyric acid per liter prepared in the same manner as described above. These treated cuttings were subjected to the same bench trials at the same time as those treated with the diesters of dihydroxy acids. After eleven days only about 90% of the cuttings had rooted and these cuttings had medium to light roots. Chrysanthemum cuttings which are dipped in water alone or in an aqueous solution of sodium lauryl sulfate (0.025% by weight) and subjected to bench rooting trials in wet sterilized sand show a rooting response under the most favorable conditions of only about 50% and are poorly calloused.

EXAMPLE II

Four inch terminal cuttings of yew (Taxus) were partially immersed for 30 seconds in an aqueous solution containing 1.0 gram of allyl methallyl carbonate and 0.25 gram of sodium lauryl sulfate as a wetting agent. The treated portion of the stems were drained of excess solution, stuck in wet sterilized sand, and watered regularly. After 54 days of such bench rooting trials the cuttings were carefuly removed from the sand. Twenty-five per cent of the cuttings had uniform heavy root formation. All cuttings treated with indolebutyric acid failed to root in the 54 day bench trial.

EXAMPLE III

Numerous two inch terminal cuttings of privet (Ligustrum) were partially immersed in an aqueous composition containing 0.5 gram of diallyl carbonate and 0.125 gram of sodium lauryl sulfate as a wetting agent to insure wetting of the treated portions of the cuttings. A like number of privet cuttings were immersed in a similar composition containing 0.5 gram per liter of indolebutyric acid. The cuttings were stuck in wet sterilized sand and watered regularly. After 25 days 65% of the cuttings treated with the diester had rooted while only 5% of the cuttings treated with indolebutyric acid had rooted.

EXAMPLE IV

Two inch terminal cuttings of Pachysandra were partially immersed in an aqueous composition containing 0.25 gram of diallyl carbonate per liter and subjected to bench rooting trials as in the above examples. After 25 days in moist sand 50% of the cuttings had rooted and all cuttings were uniformly calloused. Only 30% of the cuttings treated with indolebutyric acid had rooted during the same period.

EXAMPLE V

Three inch terminal cuttings of gardenia were partially immersed in an aqueous composition containing 1.0 gram of diallyl pimelate per liter. Similar gardenia cuttings were also partially immersed in an aqueous composition containing 1.0 gram of diallyl carbonate per liter. The treated cuttings were stuck in wet sterilized sand. After 35 days the cuttings were carefully removed from the sand and the condition of the cuttings was noted. Of the cuttings treated with diallyl pimelate 90% had rooted, while 50% of those treated with diallyl carbonate had rooted.

EXAMPLE VI

Cuttings of three "hard to root" woody plants were partially immersed in aqueous solutions of members of this new class of growth regulants. Each solution contained in addition to the regulant 0.25 gram of sodium lauryl sulfate as a wetting agent to insure good wetting of the exposed plant tissues. The treated cuttings were stuck in moist sterilized sand and cared for in the usual manner. The cuttings employed in this rooting initiation test were: 3 to 4 inch, fully leaved apple cuttings (var. Baldwin) of current fast growing terminal shoots; 2 to 3 inch cuttings of fully leaved holly (*Ilex opaca*) cuttings of the current, vigorous terminal shoots; and 3 to 4 inch assorted tea rose cuttings of the terminal shoots. In the following tables typical results obtained by the use of two members of this new class of growth regulants are given together with the concentrations employed.

Table II.—Apple cuttings—variety Baldwin

| Material Employed | Concentration, Grams per liter | Days After Treatment | | |
|---|---|---|---|---|
| | | 22, Calloused | 144, Calloused | 144, Rooted |
| | | Per Cent | Per Cent | Per Cent |
| Diallyl Carbonate | 0.50 | 47 | 80 | 7 |
| | 0.25 | 20 | 80 | 7 |
| Diallyl Pimelate | 0.25 | 60 | 87 | 0 |
| | 0.125 | 50 | 50 | 33 |

Table III.—Holly cuttings (Ilex opaca)

| Material Employed | Concentration, Grams per liter | Days After Treatment | | | |
|---|---|---|---|---|---|
| | | 64 | | 84 | |
| | | Calloused | Rooted | Calloused | Rooted |
| | | Per Cent | Per Cent | Per Cent | Per Cent |
| Diallyl Pimelate | 0.25 | 55 | 20 | 55 | 20 |
| | 0.125 | 20 | 5 | 30 | 5 |
| Diallyl Carbonate | 0.50 | 40 | 15 | 65 | 20 |
| | 0.25 | 45 | 5 | 45 | 5 |

Table IV.—Assorted tea rose cuttings

| Material Employed | Concentration, Grams per liter | Days After Treatment; 44 | |
|---|---|---|---|
| | | Calloused | Rooted |
| | | Percent | Percent |
| Diallyl Pimelate | 0.25 | 40 | 7 |
| | 0.125 | 27 | 0 |
| Diallyl Carbonate | 0.50 | 27 | 0 |
| | 0.25 | 20 | 0 |

EXAMPLE VII

Four inch terminal cuttings of daisy were partially immersed in aqueous solutions of diallyl pimelate and diallyl carbonate. The treated cuttings were stuck in wet sterilized sand and cared for in the usual manner. The cuttings were carefully removed from the sand 10 days after treatment and the rooting initiation was noted. The results of these bench rooting trials are noted in Table V below.

Table V.—Daisy cuttings

| Material Employed | Concentration, grams per liter | 10 Days After Treatment, Per cent Rooted |
|---|---|---|
| Diallyl Pimelate | 0.25 | 70 |
| | 0.125 | 90 |
| Diallyl Carbonate | 0.50 | 90 |
| | 0.25 | 90 |

An additional example of the utility of my compositions is found in their ability to reduce the set of blossoms on fruit trees. The thinning is believed to be accomplished by the stimulation of the abscission cells of the blossom stem by the hormone-like activity of the compounds. The thinning of fruit blossoms is extremely desirous for fruit trees which normally have a heavy fruit set either because of self-pollenization or otherwise, for, if the fruit set is heavy, the tree will bear only periodically, usually every other year, and the years of heavy production not only result in a large quantity of small or undersized fruit but also in limb damage because of the excess weight of the fruit. Orchard operators have attempted to overcome this heavy setting of fruit by hand thinning of the set fruit which is not only slow but relatively expensive. Thus, the premature removal of some of the blossoms by the application of a small amount of a chemical agent would be exceedingly desirable. The following example illustrates the blossom thinning ability of these new growth regulants.

EXAMPLE VIII

Peach trees, variety Hale Haven, and apple trees, varieties Greening, Golden Delicious, Blaxtayman and Wealthy were sprayed with aqueous solutions of various members of this new class of growth regulants at concentrations of from 10 to 40 parts per million together with 0.025% by weight of sodium lauryl sulfate as a wetting agent to assure good contact between the plant structure and the stimuli. The spray compositions were applied with a pressurized spraying equipment when the trees were in full bloom. To determine the effectiveness of the spray applications, the blossoms on the trees to be sprayed were counted. Within the limits that the experimental conditions would permit, one-half of the blossoms (one-half tree) on each tree were sprayed and the other one-half were unsprayed. The limbs and branches which held the sprayed blossoms were tagged to aid future observation and collection data. Some of the results of these defloration, or blossom thinning, studies are shown in the following tables which illustrate results that are typical for the class of diesters hereinbefore described.

Table VI.—Peach blossom thinning var. Hale Haven

| Material Employed | Concentration | Fruit Per 100 Spurs |
|---|---|---|
| Unsprayed | Control | 32 |
| Diallyl Carbonate | 20 p.p.m. | 20 |

*Table VII.—Apple blossom thinning var. Golden Delicious*

| Material Employed | Concentration | Fruit Per 100 Spurs |
|---|---|---|
| Unsprayed | Control | 40 |
| Diallyl Carbonate | 40 p. p. m. | 27 |

Sprays containing diallyl pimelate at a concentration of 10 parts per million and diallyl succinate at concentrations of 10 and 20 parts per million were just as effective when applied to Blaxtayman and Wealthy apple trees in full bloom, for the reduction in the number of fruit per 100 spurs was in the range of 30 to 45%. Such compounds as alpha naphthalene acetic acid when applied to concentrations of 10 p. p. m. and sodium dinitro ortho-cresylate when employed at 0.2% by weight injure the trees by burning foliage, injuring fruit spurs at times to the extent of completely eliminating the crop, and inhibits growth sometimes to the extent of stunting the plant. Thus, the use of such materials leaves much to be desired. In contrast to the erratic performance of these hormone-like materials, the concentrations of the diesters employed according to my invention can be increased 10 fold without any deleterious effect on the plant or fruit.

These diester growth regulants have numerous other uses. For example, when seeds and tubers are treated with aqueous compositions containing such materials as methyl allyl carbonate, diallyl oxalate, ethyl methallyl pimelate, cyclohexyl allyl succinate, vinyl allyl carbonate, diallyl thaspate, phenyl allyl azelate, o-chlorophenyl allyl carbonate, and the like in concentrations varying from a concentration as low as 0.1 gram per liter to about 1.0 gram per liter or higher, the root system of the resulting plants are much more prolific than those resulting from untreated seeds and tubers. A further example of the utility of these growth stimulants is illustrated by the ability of these materials to initiate root growth of plants after transplanting. For plants whose roots have been dipped into aqueous solutions of the regulants or in dusts prepared by incorporating the evocator with diatomaceous earths, talc, ordinary soil, and the like, and planted in the usual manner, produce a more prolific root system in less time than untreated transplants will and consequently are not set back in growing to the same degree that untreated plants are.

The use of these diester growth stimulants in concentrations above about 20 grams per liter or in excess of about 2% by weight sometimes produces severe injury to the plant structure when applied locally. Accordingly, when these growth regulants are applied to plants by means of compositions containing these materials in concentrations of 5% or more by weight, the injury, in many instances, may be so severe as to cause the death of the plants treated. Lower concentrations when applied to the entire plant by means of compositions which wet the entire plant or a major portion of the plant will cause the ultimate death of the plant which is desirous in many instances as in weed killing.

For example, when aqueous compositions containing 0.5% by weight of ortho- or para-chlorophenyl allyl carbonate and 0.1% of a wetting agent were applied to such deep rooted weed plants as burdock, plantains and mustard, the weed plants were dead in a few days. While the application of a composition containing 5% of ortho- or para-chlorophenyl allyl carbonate to small local areas of plants such as on the leaf petiole or on a plant stem, causes severe injury to that portion of the plant only but the remainder of the plant continues to grow and function normally. These dialkenyl diesters and mixed diesters in general are more toxic to grasses and deep rooted weed plants than to broad leaved plants and would thus be valuable herbicides for the destruction of grasses and deep rooted plants in cultivated non-cereal crops. Just how these materials cause plant injury and/or ultimate death of the plant is not completely understood, but it is believed that the presence of the plant regulant in greater quantities or to a greater portion of the plant alters the metabolic processes of the plant so that the dominance of either anabolic or ketabolic processes may lead to the death of the plant.

Although the major portion of the description of the utility of these diesters of dihydroxy acids has been directed to the altering of the growth characteristics of portions of the plant structure in such a manner as to promote the propagation of plants, it is not intended that the invention shall be so limited, for, as stated above, the materials may be employed to alter the physiology of the plant in such a manner as to kill the plant. In both cases the application of these materials alters growth characteristics of plants. Accordingly, the effect that these materials have on plants will be referred to in the appended claims as "altering the growth characteristics" of plants.

In the above examples, the concentration of the active ingredients in the compositions which were employed as growth stimulant was in the range of 0.001% to about 0.1%. Although these concentrations are considered the optimum concentrations for the purposes for which they were used, the concentration of the active ingredient can be varied from about .001% to about 1% for growth stimulation without any deleterious effects or in concentrations from 0.5 to 10% when used for killing undesirable plants. Thus, these growth stimulants have a wide range of tolerance in their application and can be safely employed without any special technical skill.

The effectiveness of the compounds within the scope of this invention will vary according to their individual characteristics, according to the type of plant structure treated and according to the purpose of the treatment. For example, a different concentration may be required for one variety of plant than that required for another and the concentration required for root initiation may be different from that required for root stimulation. Also, the concentration required for antidrop treatment, while generally similar, may not be the same as that required to produce parthenogenesis. A further example of the varied activity of these compounds has been illustrated by the effective concentration to cause the death of plants and even then the compositions were selective in their activity to general types of plants. Those skilled in the art having these factors in mind and noting the results of the above examples and the tendencies indicated therein, will be able to determine conditions most suitable in any given case. In any instance the concentrations required to achieve the desired results will fall within the range of concentrations given above.

To those skilled in the art many widely differing embodiments of the invention may become apparent. Accordingly, although I have disclosed specific examples of the utility of specific members of this new class of growth regulants, I do not thereby desire or intend to limit myself solely thereto, for as previously stated the vehicle and the amount of regulant employed may be varied and other materials of the class having equivalent physiological properties may be employed if desired without departing from the spirit and scope of the invention as defined in the appended claims.

I claim:

1. The method of altering the growth characteristics of plants which comprises treating the plant structure with a composition containing as the essential active ingredient 0.001% to 1% by weight of a diester of a dibasic acid, which acid contains 1 to 16 acyclic carbon atoms, having as one of the alcohol residues an alkenyl radical and having as the other alcohol residue an organic radical containing 1 to 10 carbon atoms selected from the class consisting of alkyl, alicyclic, alkenyl, aryl, and aralkyl radicals and their monochloro derivatives.

2. The method of altering the growth characteristics of plants which comprises treating the plant structure with a composition containing as the essential active ingredient 0.001% to 1% by weight of a diester of carbonic acid having as one of the alcohol residues an alkenyl radical containing a methylene group attached by a double bond to a carbon atom and having as the other alcohol residue an organic radical containing 1 to 10 carbon atoms selected from the class consisting of alkyl, alicyclic, alkenyl, aryl, and aralkyl radicals and their monochloro derivatives.

3. The method of altering the growth characteristics of plants which comprises treating the plant structure with a composition containing as the essential active ingredient 0.001% to 1% by weight of a diester of pimelic acid having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives.

4. The method of altering the growth characteristics of plants which comprises treating the plant structure with a compostion containing as the essential active ingredient 0.001% to 1% by weight of a diester of carbonic acid having the allyl group as one of the ester groups and having as the other ester group an organic radical containing 1 to 10 carbon atoms selected from the class consisting of alkyl, alicyclic, alkenyl, aryl, and aralkyl radicals and their monochloro derivatives.

5. The method of altering the growth characteristics of plants which comprises treating the plant structure with a compostion containing as the essential active ingredient 0.001% to 1% by weight of diallyl carbonate.

6. The method of altering the growth characteristics of plants which comprises treating the plant structure with a compostion containing as the essential active ingredient 0.001% to 1% by weight of diallyl pimelate.

7. The method of altering the growth characteristics of plants which comprises treating the plant structure with a composition containing as the essential active ingredient 0.001% to 1% by weight of monochlorophenyl allyl carbonate.

8. The method of altering the growth characteristics of plants which comprises treating the plant structure with a composition containing as the essential active ingredient 0.001% to 1% by weight of allyl methallyl carbonate.

9. A composition for altering the growth characteristics of plants containing as an essential active ingredient 0.001% to 1% by weight of a diester of a dibasic acid, which acid contains 1 to 16 carbon atoms in an open chain, having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives, and also containing, as a carrier therefor, a major portion of an aqueous solution of a surface active agent.

10. A composition for altering the growth characteristics of plants containing as an essential active ingredient 0.001% to 1% by weight of a diester of a dibasic acid, which acid contains 1 to 16 carbon atoms in an open chain, having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives, and also containing, as a carrier therefor, a major portion of a finely-divided pulverulent solid.

11. A composition for altering the growth characteristics of plants containing as an essential active ingredient 0.001% to 1% by weight of a diester of carbonic acid, having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives, and also containing, as a carrier therefor, a major portion of an aqueous solution of a surface active agent.

12. A composition for altering the growth characteristics of plants containing as an essential active ingredient 0.001% to 1% by weight of a diester of carbonic acid, having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives, and also containing, as a carrier therefor, a major portion of a finely-divided pulverulent solid.

13. A composition for altering the growth characteristics of plants containing as an essential active ingredient 0.001% to 1% by weight of a diester of pimelic acid, having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives, and also containing, as a carrier therefor, a major portion of an aqueous solution of a surface active agent.

14. A composition for altering the growth characteristics of plants containing as an essential active ingredient 0.001% to 1% by weight of a diester of pimelic acid, having as one of the ester groups an alkenyl radical containing a methylene group attached by a double bond to a carbon atom in the alkenyl chain and having as the other ester group an organic radical containing 1 to 10 carbon atoms selected from the class consisting of alkyl, alicyclic, alkenyl, aryl and aralkyl radicals and their monochloro derivatives, and also containing, as a carrier therefor, a major portion of a finely-divided pulverulent solid.

15. A composition for altering the growth characteristics of plants containing as an essential active ingredient 0.001% to 1% by weight of dialkyl carbonate and also containing, as a carrier therefor, a major portion of an aqueous solution of a surface active agent.

16. A composition for altering the growth characteristics of plants containing as an essential active ingredient 0.001% to 1% by weight of dialkyl carbonate and also containing, as a carrier therefor, a major portion of a finely-divided pulverulent solid.

17. A composition for altering the growth characteristics of plants containing as an essential active ingredient 0.001% to 1% by weight of diallyl pimelate and also containing, as a carrier therefor, a major portion of an aqueous solution of a surface active agent.

18. A composition for altering the growth characteristics of plants containing as an essential active ingredient 0.001% to 1% by weight of diallyl pimelate and also containing, as a carrier therefor, a major portion of a finely-divided pulverulent solid.

19. A composition for altering the growth characteristics of plants containing as an essential active ingredient 0.001% to 1% by weight of monochlorophenyl allyl carbonate and also containing, as a carrier therefor, a major portion of an aqueous solution of a surface active agent.

20. A composition for altering the growth characteristics of plants containing as an essential active ingredient 0.001% to 1% by weight of monochlorophenyl allyl carbonate and also containing, as a carrier therefor, a major portion of a finely-divided pulverulent solid.

21. A composition for altering the growth characteristics of plants containing as an essential active ingredient 0.001% to 1% by weight of methallyl carbonate and also containing, as a carrier therefor, a major portion of an aqueous solution of a surface active agent.

22. A composition for altering the growth characteristics of plants containing as an essential active ingredient 0.001% to 1% by weight of methallyl carbonate and also containing, as a carrier therefor, a major portion of a finely-divided pulverulent solid.

WILLIAM D. STEWART.

REFERENCES CITED

The following references are of record in the file of this patent:

UNITED STATES PATENTS

| Number | Name | Date |
|---|---|---|
| 2,258,291 | Jones | Oct. 7, 1941 |
| 2,322,761 | Lontz | June 29, 1943 |
| 2,390,941 | Jones | Dec. 11, 1945 |
| 2,391,824 | English et al. | Dec. 25, 1945 |
| 2,394,916 | Jones | Feb. 12, 1946 |
| 2,396,513 | Jones | Mar. 12, 1946 |

OTHER REFERENCES

Beilstein's Handbuch der Organischen Chemie, page 7 of second supplement to vol. 3 (1942).

Scientific American, April 1941, pages 226–228.

Botanical Gazette, June 1946, pages 475 to 484 and 501.

Handbook of Chemistry and Physics, 28th ed (1944), pages 549, 920 and 921.